United States Patent
Li et al.

(10) Patent No.: US 7,835,637 B2
(45) Date of Patent: Nov. 16, 2010

(54) PREDICTIVE FOCUS VALUE CALCULATION FOR IMAGE CAPTURE DEVICES

(75) Inventors: Jingqiang Li, San Diego, CA (US); Szepo Robert Hung, Carlsbad, CA (US); Ying Xie Noyes, San Diego, CA (US); Chinchuan Andrew Chiu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 11/533,620

(22) Filed: Sep. 20, 2006

(65) Prior Publication Data

US 2008/0069553 A1  Mar. 20, 2008

(51) Int. Cl.
  *G03B 13/34* (2006.01)
(52) U.S. Cl. .................... 396/125; 348/349; 396/101; 396/102
(58) Field of Classification Search ............. 348/411.1, 348/412.1, 349; 396/104, 122, 96, 101, 102, 396/182
See application file for complete search history.

(56) References Cited

U.S. PATENT DOCUMENTS

| | | | | |
|---|---|---|---|---|
| 4,908,645 A | * | 3/1990 | Higashihara et al. | 396/95 |
| 5,083,150 A | * | 1/1992 | Nagasaki et al. | 396/49 |
| 5,179,407 A | | 1/1993 | Kusaka | |
| 5,208,625 A | * | 5/1993 | Suekane | 396/95 |
| 5,225,940 A | * | 7/1993 | Ishii et al. | 359/823 |
| 5,873,006 A | | 2/1999 | Iwane | |
| 6,094,537 A | * | 7/2000 | Okazaki et al. | 396/127 |
| 7,158,182 B2 | * | 1/2007 | Watanabe et al. | 348/345 |
| 7,184,090 B2 | * | 2/2007 | Watanabe et al. | 348/349 |
| 7,262,804 B2 | * | 8/2007 | Watanabe | 348/349 |
| 7,428,378 B1 | * | 9/2008 | Warpakowski Furlan | 396/157 |
| 7,474,846 B2 | * | 1/2009 | Subbotin | 396/102 |
| 2003/0063211 A1 | * | 4/2003 | Watanabe et al. | 348/345 |

(Continued)

FOREIGN PATENT DOCUMENTS

DE   4006592   9/1990

OTHER PUBLICATIONS

International Search Report—PCT/US07/078715—International Search Authority—European Patent Office, Feb. 21, 2008.

*Primary Examiner*—Melissa J Koval
*Assistant Examiner*—Linda B Smith
(74) *Attorney, Agent, or Firm*—Timothy F. Loomis; James R. Gambale, Jr.

(57) ABSTRACT

Techniques are described for predictive focus value calculation within image capture devices. Image capture devices may include digital still cameras and digital video cameras. The techniques include performing an auto-focus process within an image capture device by predicting a focus value for a scene at a lens position of a lens included in the image capture device based on a corrupt focus value for the lens position calculated from a first frame directly after lens settlement. Therefore, the auto-focus process may determine size and direction of movement for the lens to a next lens position based on the predicted valid focus value, and move the lens to the next lens position during a second frame. In this way, the techniques may move the lens to another lens position during each frame, greatly reducing auto-focus latency by potentially doubling or tripling the speed of the auto-focus process.

25 Claims, 9 Drawing Sheets

U.S. PATENT DOCUMENTS

| | | |
|---|---|---|
| 2003/0099044 A1 | 5/2003 | Fujii |
| 2004/0233320 A1 | 11/2004 | Watanabe |
| 2005/0134720 A1* | 6/2005 | Lee .............................. 348/345 |
| 2006/0018650 A1 | 1/2006 | Ichimaya |
| 2007/0147817 A1* | 6/2007 | Li et al. ...................... 396/133 |

* cited by examiner

PREDICTIVE FOCUS VALUE CALCULATION FOR IMAGE CAPTURE DEVICES

TECHNICAL FIELD

The disclosure relates to capturing images with an image capture device and, more specifically, calculating focus values for the images.

BACKGROUND

Image capture devices, such as digital video cameras or digital still cameras, are used in different applications and environments. An image capture device should be capable of producing high quality imagery from a variety of distances relative to a target of a scene. A typical image capture device performs an auto-focus process to select a position of a lens within the image capture device that achieves a sharp focus for an image frame of the scene. An image capture device may perform an active auto-focus process, a passive auto-focus process, or a combination of the two processes.

In the case of a through-the-lens (TTL) passive auto-focus process, the auto-focus process included in an image capture device calculates a focus value, i.e., a score that represents a degree of focus, at several sampled lens positions and selects the position of the lens for the scene based on the focus values. Moving the lens to each of the sampled lens positions is independent, i.e., asynchronous, of calculating focus values for the scene. In other words, the auto-focus process calculates focus values for the scene during each frame, but has to know which one of the focus values is valid for the lens position after the lens movement.

A sensor array included in the image capture device obtains image information for the scene during each frame and the auto-focus process calculates focus values for the scene from each frame. However, in order to get a valid focus value for the scene at a lens position, the auto-focus process has to wait for a valid frame that initiated integration of image information for the scene after lens settlement at the lens position. The auto-focus process may discard the focus values calculated for the scene during the corrupted frames that initiated integration of image information before the lens has settled.

Depending on the type of sensor array, e.g., charge-coupled device (CCD) or complementary metal-oxide semiconductor (CMOS), the first valid frame may be two or three frames after lens settlement. Therefore, the auto-focus process may have to wait a few frames to calculate a valid focus value for each of the sampled lens positions. The auto-focus process may determine a size and direction of movement for the lens to a next lens position only after calculating a valid focus value for the current lens position.

SUMMARY

In general, the disclosure relates to techniques for predictive focus value calculation within image capture devices. Image capture devices may include digital still cameras and digital video cameras. The techniques include predicting a valid focus value for a scene at a lens position based on a corrupt focus value for the lens position. The corrupt focus value is calculated from a first frame directly after lens settlement. Therefore, the predictive auto-focus process may determine size and direction of movement for the lens to a next lens position based on the predicted valid focus value, and move the lens to the next lens position during a second frame. In this way, the techniques may move the lens to another lens position during each frame, greatly reducing auto-focus latency by potentially doubling or tripling the speed of a conventional auto-focus process.

According to the techniques described herein, an image capture device includes an image capture controller that moves a lens to a different lens position during each frame and a sensor array that obtains image information for a scene at different movement stages of the lens during each frame. After readout of the image information from an entire first frame, a predictive auto-focus module included in the image capture device calculates a corrupt focus value for the scene at a first lens position from the first frame directly after lens settlement at the first lens position. The predictive auto-focus module predicts a valid focus value for the scene at the first lens position based on the corrupt focus value for the first lens position. The predictive auto-focus module may then determine a second lens position based on the predicted lens position. The image capture controller moves the lens to the determined second lens position during a second frame.

Upon determining a maximum predicted focus value for the scene, the predictive auto-focus module selects the lens position associated with the maximum predicted focus value for the scene. The image capture controller sets the selected lens position for the scene and the sensor array captures an image frame of the scene using the selected lens position to achieve a sharp focus for the image frame of the scene.

In one embodiment, the disclosure provides a method comprising moving a lens included in an image capture device to a lens position during a first frame, and calculating a corrupt focus value for a scene at the lens position from the first frame after lens settlement. The method further comprises predicting a valid focus value for the scene at the lens position based on the corrupt focus value.

In another embodiment, the disclosure provides a method comprising predicting a valid focus value for a scene at a first lens position of a lens included in an image capture device based on a corrupt focus value for the first lens position calculated from a first frame after lens settlement at the first lens position. The method also comprises moving the lens to a second lens position during a second frame directly after calculating the corrupt focus value for the first lens position.

In another embodiment, the disclosure provides a computer-readable medium comprising instructions that cause a programmable processor to move a lens included in an image capture device to a lens position during a first frame, calculate a corrupt focus value for a scene at the lens position from the first frame after lens settlement, and predict a valid focus value for the scene at the lens position based on the corrupt focus value.

In a further embodiment, the disclosure provides a device comprising an image capture controller that moves a lens included in the device to a lens position during a first frame. The device also includes a predictive auto-focus module that calculates a corrupt focus value for the scene at the lens position from the first frame after lens settlement, and predicts a valid focus value for the scene at the lens position based on the corrupt focus value.

In another embodiments, the disclosure provides a device comprising a predictive auto-focus module that predicts a valid focus value for a scene at a first lens position of a lens included in an image capture device based on a corrupt focus value for the first lens position calculated from a first frame after lens settlement at the first lens position. The device further comprises an image capture controller that moves the lens to a second lens position during a second frame directly after calculating the corrupt focus value for the first lens position.

In a further embodiment, the disclosure provides a device comprising means for moving a lens included in the device to a first lens position during a first frame, and means for calculating a corrupt focus value for the scene at the first lens position from the first frame after lens settlement at the first lens position, and predicts a valid focus value for the scene at the first lens position based on the corrupt focus value. The means for moving the lens moves the lens to a second lens position during a second frame directly after calculation of the corrupt focus value for the first lens position.

The techniques described herein may be implemented in hardware, software, firmware, or any combination thereof. If implemented in software, the techniques may be realized in whole or in part by a computer readable medium comprising instructions that, when executed by a processor, performs one or more of the methods described herein.

The details of one or more embodiments are set forth in the accompanying drawings and the description below. Other features, objects, and advantages will be apparent from the description and drawings, and from the claims.

DETAILED DESCRIPTION

Figure 1:
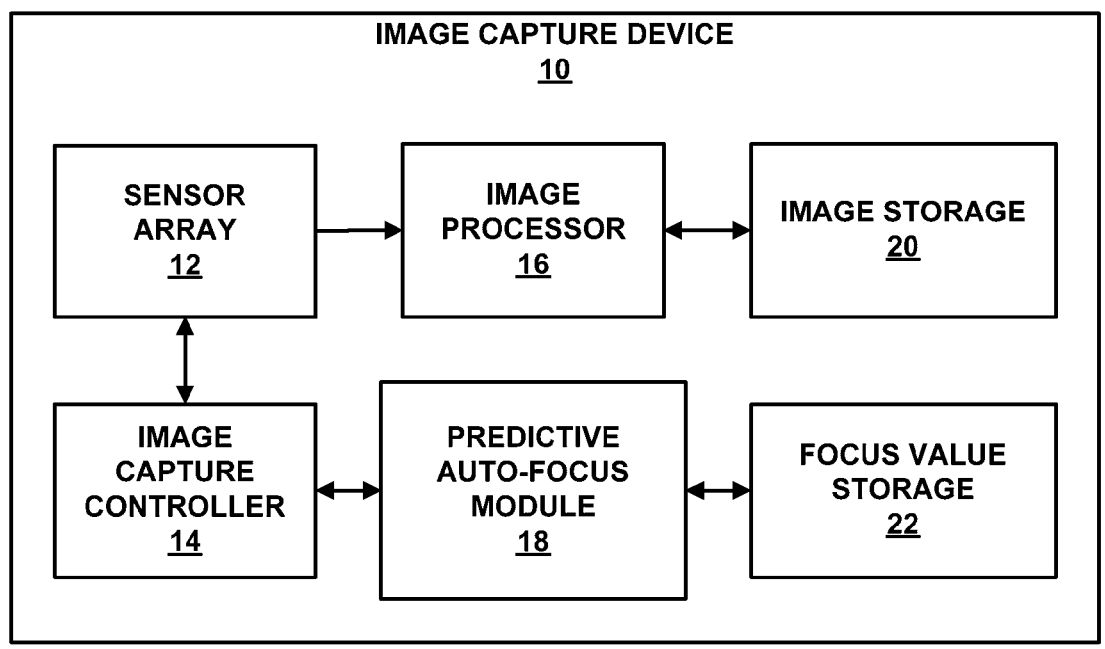
FIG. 1 is a block diagram illustrating an exemplary image capture device for capturing image information from a scene.

FIG. 1 is a block diagram illustrating an exemplary image capture device 10 for capturing image information from a scene. According to the techniques described in this disclosure, image capture device 10 performs predictive focus value calculation for a predictive auto-focus process performed within image capture device 10. A focus value comprises a score that represents a degree of focus. Image capture device 10 predicts a focus value for a scene at a lens position of a lens included in image capture device 10 based on a corrupt focus value for the lens position calculated from a first frame directly after lens settlement. Therefore, the predictive auto-focus process may determine size and direction of movement for the lens to a next lens position based on the predicted valid focus value, and move the lens to the next lens position during a second frame. In this way, the techniques may move the lens to another lens position during each frame.

As shown in FIG. 1, image capture device 10 includes a sensor array 12, an image capture controller 14, an image processor 16, a predictive auto-focus module 18, an image storage device 20, and a focus value storage device 22. The components included in image capture device 10 illustrated in FIG. 1 may be realized by any suitable combination of hardware and/or software. In the illustrated embodiment, the components are depicted as separate units. However, in other embodiments, any of the components may be integrated into combined units within common hardware and/or software. Accordingly, the representation of features as components or modules is intended to highlight particular functional features, and does not necessarily require realization of such features by separate hardware or software.

Image capture device 10 may be a digital camera, such as a digital video camera, a digital still camera, or a combination of both. In addition, image capture device 10 may be a stand-alone device, such as a stand-alone camera, or be integrated in another device, such as a wireless communication device. As an example, image capture device 10 may be integrated in a mobile telephone to form a so-called camera phone or video phone. Image capture device 10 preferably is equipped to capture color imagery, black-and-white imagery, or both. In this disclosure, the terms "image," "imagery," "image information," or similar terms may interchangeably refer to either video or still pictures. Likewise, the term "frame" may refer to either a video frame or a still picture frame obtained by image capture device 10.

Sensor array 12 obtains image information for a scene prior to capturing an image frame of the scene. Sensor array 12 includes a two-dimensional array of individual image sensors, e.g., arranged in rows and columns. Sensor array 12 may comprise, for example, an array of solid state sensors such as complementary metal-oxide semiconductor (CMOS) sensors or charge-coupled device (CCD) sensors. The image sensors within sensor array 12 are exposed to the scene to obtain image information for the scene and to capture an image frame of the scene. The solid state sensors in sensor array 12 do not instantaneously capture all of the image information of a frame. Instead, the sensors are sequentially exposed to the scene to obtain the image information of the frame. Image capture device 10 sets an integration time for sensor array 12, limiting the amount of time to which sensor array 12 is exposed to light to obtain image information of a given frame.

Sensor array 12 provides the image information of one or more frames to image processor 16 for storage in image storage device 20. Sensor array 12 also provides the image information to image capture controller 14. Image capture controller 14 utilizes the image information for preliminary visual front end (VFE) processing, such as automatic focus and automatic exposure. For example, image capture controller 14 initiates an auto-focus process based on the image information from sensor array 12. The auto-focus process within image capture device 10 calculates focus values at several sampled lens positions and selects the position of the lens for the scene based on the focus values. The selected lens position may be associated with the maximum focus value for the scene.

A conventional auto-focus process within an image capture device calculates focus values for the scene during each frame, but has to know which one of the focus values is valid for the lens position after lens movement. In order to get a valid focus value for the scene at the lens position, the conventional auto-focus process has to wait for a valid frame that initiated integration of image information for the scene after lens settlement at the lens position. Moving the lens from a previous lens position to the current lens position takes time depending on motor design. Lens settlement occurs once the lens reaches the current lens position and stops moving. In some cases, the first valid frame may be two or three frames after lens settlement. The conventional auto-focus process may determine a size and direction of movement for the lens to a next lens position only after calculating a valid focus value for the current lens position.

In this way, the conventional auto-focus process may take an unacceptably long period of time to identify a lens position with a maximum focus value for the scene to achieve a sharp image frame of the scene. For example, if the conventional auto-focus process moves the lens to ten different lens positions before selecting one of the lens positions for the scene, the conventional auto-focus process has to wait three frames at each of the lens positions to calculate a valid focus value for the lens position. Therefore, the conventional auto-focus process requires 30 frames or approximately 2 seconds to select an accurate lens position for the scene.

The techniques disclosed herein enable image capture device 10 to predict valid focus values for a lens position from a first frame directly after lens settlement during a second frame, without waiting until a valid (third or fourth) frame for the lens position. Image capture device 10 performs a predictive auto-focus process by predicting a focus value for a scene at a lens position based on a corrupt focus value for the lens position. A focus value may be considered corrupt for a lens position when calculated after lens settlement at the lens position, but before a valid frame that initiates integration of image information for the scene after lens settlement at the lens position. The corrupt focus value may be calculated from a first frame directly after lens settlement. Therefore, the predictive auto-focus process may determine size and direction of movement for the lens to a next lens position based on the predicted valid focus value, and move the lens to the next lens position during a second frame. In this way, the techniques may move the lens to another lens position during each frame, greatly reducing auto-focus latency by potentially doubling or tripling the speed of a conventional auto-focus process.

Image capture controller 14 moves a lens included in image capture device 10 to a different lens position during each frame. Sensor array 12 obtains image information for a scene at different movement stages of the lens during each frame. After readout of the image information for an entire first frame, predictive auto-focus module 18 calculates a corrupt focus value for the scene at a first lens position from the first frame directly after lens settlement at the first lens position.

Predictive auto-focus module 18 predicts a valid focus value for the scene at the first lens position based on the corrupt focus value for the first lens position. Predictive auto-focus module 18 may then store the predicted valid focus value for the first lens position in focus value storage device 22 along with valid focus values for previous lens positions. Predictive auto-focus module 18 may determine a second lens position based on the predicted focus value for the first lens position. Image capture controller 14 moves the lens to the determined second lens position during the second frame.

Upon determining a maximum predicted focus value for the scene, predictive auto-focus module 18 selects the lens position associated with the maximum predicted focus value for the scene. Image capture controller 14 then sets the selected lens position for the scene and sensor array 12 captures an image frame of the scene using the selected lens position to achieve a sharp focus for the image frame of the scene.

In this way, the predictive auto-focus process may take a relatively short period of time to identify a lens position with a maximum focus value for the scene to achieve a sharp image frame of the scene. For example, if the predictive auto-focus process moves the lens to ten different lens positions before selecting one of the lens positions for the scene, the predictive auto-focus process has to wait only one frame at each of the lens positions to predict a valid focus value for the lens position. Therefore, the conventional auto-focus process requires only 10 frames or approximately 0.7 seconds to select an accurate lens position for the scene.

Predictive auto-focus module 18 may be implemented as an independent hardware component or as a programmable feature of a logic device, such as a microprocessor, DSP or the like. In some embodiments, predictive auto-focus module 18 may be a programmable or integrated feature of a logic device implementing image processor 16. In particular, predictive auto-focus module 18 may be implemented as one or more software processes executed by such a logic device.

Image processor 16 receives the captured image frame from sensor array 12 and performs any necessary processing on the image frame. Image processor 16 may, for example, perform filtering, cropping, demosaicing, compression, image enhancement, or other processing of the image frame captured by sensor array 12. Image processor 16 may be realized by a microprocessor, digital signal processor (DSP), application specification integrated circuit (ASIC), field programmable gate array (FPGA), or any other equivalent discrete or integrated logic circuitry. In some embodiments, image processor 16 may form part of an encoder-decoder (CODEC) that encodes the image frame according to a particular encoding technique or format, such as MPEG-2, MPEG-4, ITU H.263, ITU H.264, JPEG, or the like.

Image processor 16 stores the image frame in image storage device 20. Image processor 16 may store raw image frames, processed image frames, or encoded image frames in image storage device 20. If the imagery is accompanied by audio information, the audio also may be stored in image storage device 20, either independently or in conjunction with the image frames. Image storage device 20 may comprise any volatile or non-volatile memory or storage device, such as read-only memory (ROM), electrically erasable programmable read-only memory (EEPROM), or FLASH memory, or such as a magnetic data storage device or optical data storage device.

Figure 2:
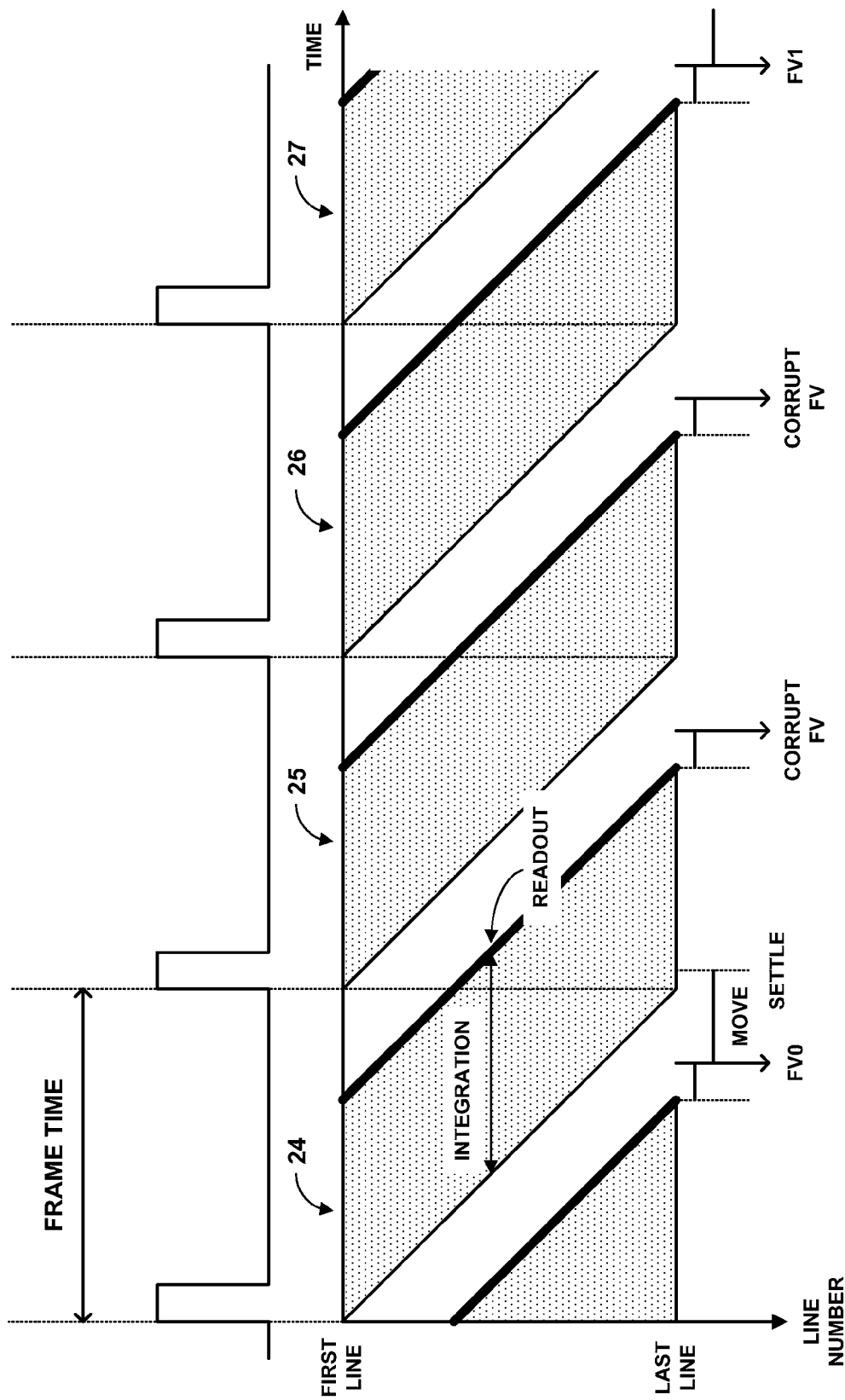
FIG. 2 is a plot illustrating exemplary integration and readout of image information within a conventional auto-focus process.

FIG. 2 is a plot illustrating exemplary integration and readout of image information within a conventional auto-focus process. In this example, a sensor array within an image capture device conforms to an array of CMOS sensors with a rolling shutter that sequentially exposes the sensors within the sensor array to a scene. The illustrated plot includes integration and readout time of the image information from each line of the sensor array for each frame of the scene. FIG. 2 also illustrates a frame rate associated with the integration and readout plot.

The conventional auto-focus process included in the image capture device calculates focus values at several sampled lens positions and selects the position of the lens for the scene based on the focus values. As shown in FIG. 2, at the start of each frame of the scene, the sensor array initiates integration of the image information for the scene. The CMOS sensors within the sensor array are sequentially exposed to the scene by the rolling shutter to obtain the image information for each frame. The rolling shutter causes each line of the sensor array to begin and end integration at a different time. In addition, the rolling shutter causes the sensor array to simultaneously initiate integration of image information from a current frame with the last line and from a next frame with the first line. In this way, the sensor array is continually integrating image information for the scene.

The conventional auto-focus process calculates focus values for the scene during each frame upon readout of the image information for the entire frame. However, moving a lens within the image capture device to different lens positions is independent of calculating focus values for the scene based on the received image information. The conventional auto-focus process has to know which one of the focus values is valid for the lens position after the lens movement. In order to get a valid focus value for the scene at a lens position, the conventional auto-focus process has to wait for a valid frame that initiated integration of image information for the scene after lens settlement at the lens position.

For example, as shown in FIG. 2, at the start of a first frame 24 of the scene, the sensor array initiates integration of image information for the scene from first frame 24 with each line of the sensor array. During first frame 24, the conventional auto-focus process calculates a valid focus value, $FV_0$, for the scene at an initial lens position and moves the lens from the initial lens position to a first lens position. Lens settlement occurs once the lens reaches the current lens position and stops moving. However, moving the lens takes time and the lens does not settle at the first lens position within the image capture device until after the start of a second frame 25. Therefore, the sensor array has already initiated integration of the image information for the scene from second frame 25 by the time the lens settles at the first lens position.

The conventional auto-focus process calculates a corrupt focus value for the scene at the first lens position based on the image information from first frame 24 directly after lens settlement at the first lens position during second frame 25. The focus value may be considered corrupt for the first lens position because the focus value is calculated after lens settlement at the first lens position, but before a valid frame that initiates integration of image information for the scene after lens settlement at the first lens position. In addition, the conventional auto-focus process calculates another corrupt focus value for the scene at the first lens position based on the image information from second frame 25 during third frame 26. The conventional auto-focus process may discard the corrupt focus values calculated for the scene during the frames that initiated integration of image information before the lens has settled.

As shown in FIG. 2, the conventional auto-focus process has to wait until a third frame 26 to calculate a valid focus value for the scene at the first lens position. At the start of third frame 26, the sensor array initiates integration of the image information for the scene from third frame 26 after the lens has settled at the first lens position. Therefore, the conventional auto-focus process calculates a valid focus value, $FV_1$, for the scene at the first lens position after readout of the image information from the entire third frame 26 during a fourth frame 27. The conventional auto-focus process may determine a size and direction of movement for the lens to a second lens position only after calculating the valid focus value for the first lens position during fourth frame 27. In this way, the conventional auto-focus process may take an unacceptably long period of time to identify a lens position with a maximum focus value for the scene to achieve a sharp image frame of the scene.

Figure 3:
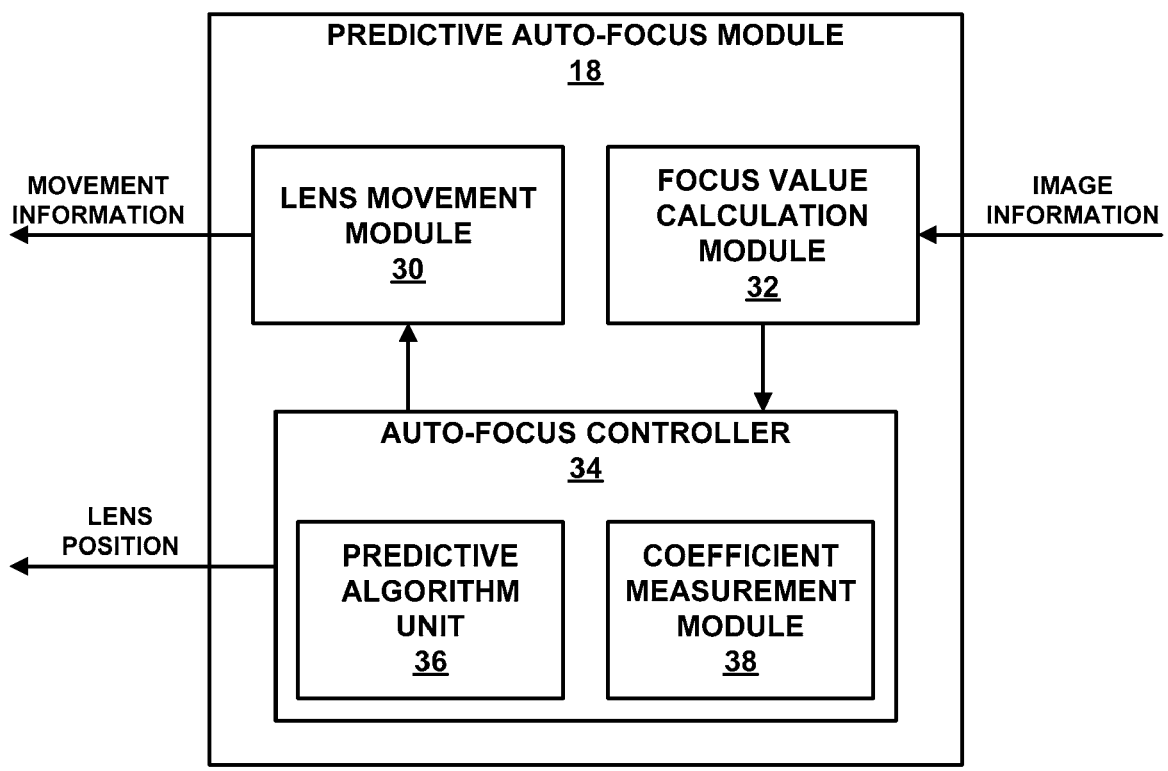
FIG. 3 is a block diagram illustrating a predictive auto-focus module within the image capture device from FIG. 1 in greater detail.

FIG. 3 is a block diagram illustrating predictive auto-focus module 18 within image capture device 10 from FIG. 1 in greater detail. As illustrated in FIG. 3, predictive auto-focus module 18 includes a focus value calculation module 32, an auto-focus controller 34, and a lens movement module 30. Predictive auto-focus module 18 within image capture device 10 calculates a focus value at several sampled lens positions and selects the position of the lens for the scene based on the focus values. The selected lens position may be associated with the maximum focus value for the scene.

Predictive auto-focus module 18 receives image information for each frame of a scene from image capture controller 14 at different movement stages of a lens included in image capture controller 10. Predictive auto-focus module 18 then outputs either lens movement information or a selected lens position for the scene to image capture controller 14 based on predicted focus values calculated for the scene at a plurality of lens positions based on the image information.

Figure 4:
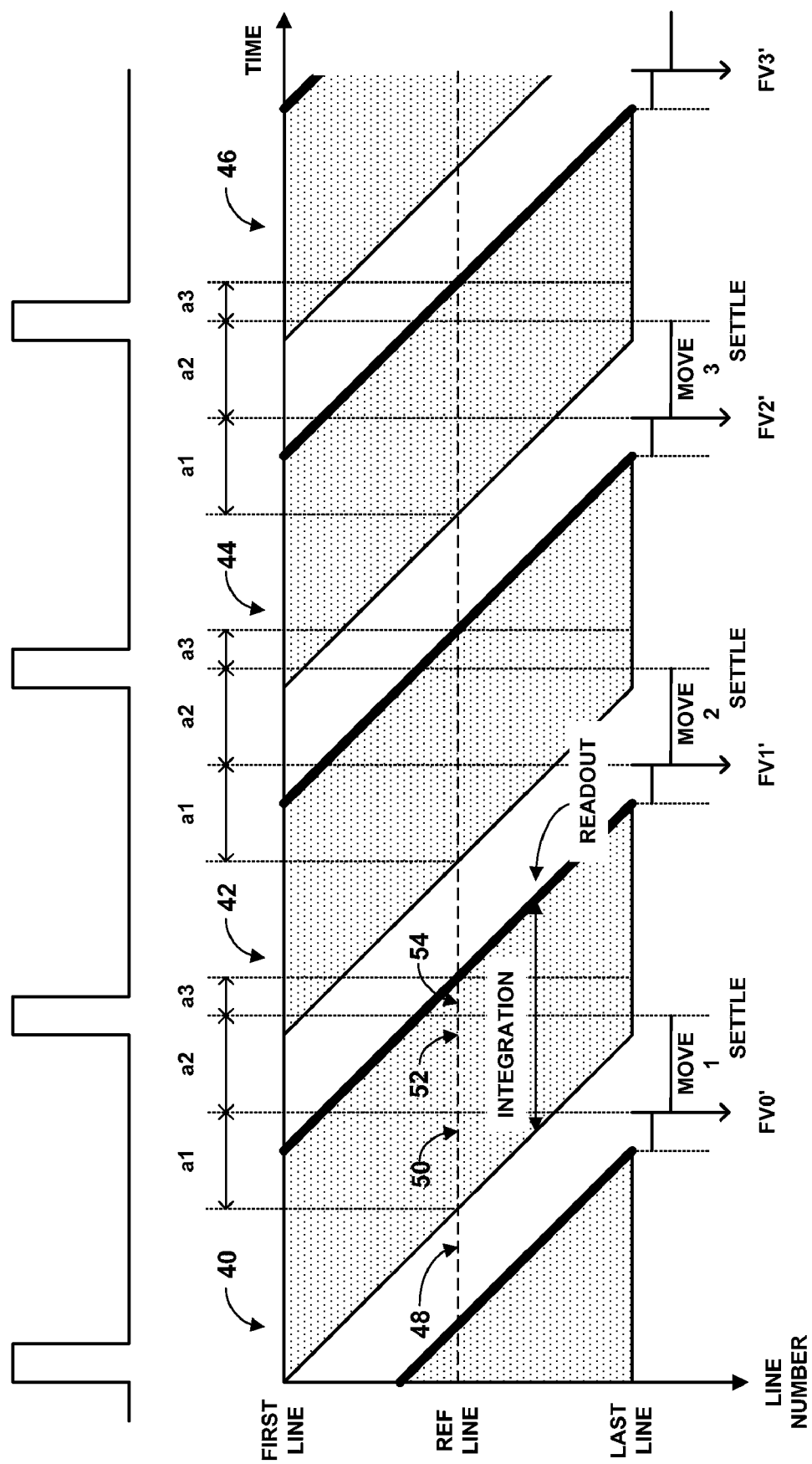
FIG. 4 is a plot illustrating exemplary integration and readout of image information within a predictive auto-focus process

FIG. 4 is a plot illustrating exemplary integration and readout of image information within a predictive auto-focus process. In this embodiment, sensor array 12 within image capture device 10 conforms to an array of CMOS sensors with a rolling shutter. The illustrated plot includes integration and readout time of the image information from each line of sensor array 12 for each frame of the scene. As shown in FIG. 4, at the start of each frame of the scene, sensor array 12 initiates integration of the image information for the scene. The CMOS sensors within sensor array 12 are sequentially exposed to the scene by the rolling shutter to obtain the image information for each frame. The rolling shutter causes each line of sensor array 12 to begin and end integration at a different time. In addition, the rolling shutter causes sensor array 12 to simultaneously initiate integration of image information from a current frame with the last line and from a next frame with the first line. In this way, sensor array 12 is continually integrating image information for the scene.

Sensor array 12 initiates integration of image information for a scene at the start of a first frame 40. During first frame 40, predictive auto-focus module 18 predicts a valid focus value, $FV_0$, for the scene at an initial lens position based on a corrupt focus value, $FV_0'$, for the initial lens position. Predictive auto-focus module 18 may then store the predicted valid focus value, $FV_0$, for the initial lens position in focus value storage device 22 along with valid focus values for previous lens positions. Image capture controller 14 then moves the lens from the initial lens position to a first lens position. Lens settlement occurs once the lens reaches the current lens position and stops moving. Moving the lens takes time and the lens does not settle at the first lens position within the image capture device until after the start of a second frame 42.

Sensor array 12 continues to integrate image information for the scene at different movement stages of the lens during first frame 40. Image capture controller 14 then completes readout of the image information from each line of sensor array 12 for the entire first frame 40 during second frame 42. Image capture controller 14 sends the image information for the entire first frame 40 to predictive auto-focus module 18.

Predictive auto-focus module 18 forwards the image information to focus value calculation module 32. Focus value calculation module 32 calculates a corrupt focus value, $FV_1'$, for the scene at the first lens position based on the image information from first frame 40 directly after lens settlement at the first lens position during second frame 42. The focus value, $FV_1'$, may be considered corrupt for the first lens position because the focus value is calculated after lens settlement at the first lens position, but before a valid frame that initiates integration of image information for the scene after lens settlement at the first lens position.

Focus value calculation module 32 sends the corrupt focus value, $FV_1'$, to auto-focus controller 34. Coefficient measurement module 38 within auto-focus controller 34 divides integration time by sensor array 12 at a reference line 48 of first frame 40 into the different movement stages of the lens during first frame 40. For example, reference line 48 may comprise a center line of sensors within sensor array 12. The integration time may be divided into a before lens movement stage 50, a during lens movement stage 52, and an after lens movement stage 54. Coefficient measurement module 38 then measures a first coefficient, a1, for first frame 40 at the before lens movement stage 50. Coefficient measurement module 38 also measures a second coefficient, a2, for first frame 40 at the during lens movement stage 52, and a third coefficient, a3, for first frame 40 at the after lens movement stage 54. A sum of the coefficients is equal to one, i.e., a1+a2+a3=1.

In some cases, values of the individual coefficients may be difficult to measure accurately as each of the coefficients is less then one. Therefore, in some cases, coefficient measurement module 38 may estimate the coefficient values. For example, if reference line 48 corresponds to the center line of sensors within sensor array 12, the total integration time will be at least halfway complete by the time image capture controller 14 moves the lens to the first lens position during first frame 40. Therefore, the first coefficient, a1, will be greater then 0.5, and the second coefficient, a2, and the third coefficient, a3, combined will be less then 0.5. In this case, coefficient measurement module 38 may set the first coefficient, a1, equal to one, and set the second coefficient, a2, and the third coefficient, a3, equal to zero.

Predictive algorithm unit 36 included in auto-focus controller 34 predicts a valid focus value, $FV_1$, for the scene at the first lens position based on the corrupt focus value ($FV_1'$), the coefficients (a1, a2 and a3) for first frame 40, and a valid focus value ($FV_0$) for the previous lens position retrieved from focus value storage device 22. For example, predictive algorithm unit 36 may predict the valid focus value for the first lens position, $FV_1$, based on the equation $FV_1' = a1 \cdot FV_0 + a2 \cdot (FV_0 \rightarrow FV_1) + a3 \cdot FV_1$, wherein $FV_0 \rightarrow FV_1$ is a transitional focus value during movement from the previous lens position and the first lens position.

The translational focus value is a weighted value between the focus value for the initial lens position, $FV_0$, and the focus value for the first lens position, $FV_1$. If the lens moves from the initial lens position to the first lens position with constant speed, the transitional focus value is the average of the focus value at the initial lens position and the focus value at the first lens position. However, if the lens movement is not constant, the percentage of lens movement is estimated at approximately the middle point of the during lens movement stage 52. A weight corresponding to the percentage of lens movement at the middle point is assigned to the focus value for the initial lens position, $FV_0$, and a weight corresponding to the remaining percentage of lens movement is assigned to the focus value for the first lens position, $FV_1$. For example, if at the middle point of the during lens movement stage 52 the lens movement is 75% complete, then the transitional focus value $FV_0 \rightarrow FV_1$ will be $0.75*FV_0 + 0.25*FV_1$.

In the case where coefficient measurement module 38 set the first coefficient, a1, equal to one, and set the second coefficient, a2, and the third coefficient, a3, equal to zero, predictive algorithm unit 36 may predict a valid focus value for the first lens position, $FV_1$, based on the equation $FV_2' = FV_1$, wherein $FV_2'$ is the corrupt focus value for a subsequent lens position.

After predicting the valid focus value for the first lens position, auto-focus controller 34 may review the valid focus value for the first lens position and the previous lens positions to determine whether one of the lens positions has the maximum predicted focus value for the scene. If the maximum focus value has not been predicted, auto-focus controller 34 sends the predicted focus value for the first lens position to lens movement module 30. Lens movement module 30 determines a second lens position for the lens directly after calculating the corrupt focus value for the first lens position based on the predicted focus value for the first lens position and the valid focus values for the previous lens positions retrieved from focus value storage device 22. Lens movement module 30 sends movement information to image capture controller 14 that includes movement step size and movement direction information for the lens. Image capture controller 14 then moves the lens from the first lens position to the second lens position during second frame 52 based on the movement information.

Predictive auto-focus module 18 continues to predict valid focus values at each of a plurality of lens positions based on corrupt focus values for corresponding lens positions, coefficients of corresponding frames, and previous valid focus values until the maximum focus value for the scene is predicted at one of the lens positions. As shown in FIG. 4, focus value calculation module 32 calculates a corrupt focus value, $FV_2'$, for the scene at the second lens position based on image information from second frame 42 directly after lens settlement at the second lens position during a third frame 44, and calculates a corrupt focus value, $FV_3'$, for the scene at a third lens position based on image information from third frame 44 directly after lens settlement at the third lens position during a fourth frame 46.

Predictive algorithm unit 36 then predicts a valid focus value, $FV_2$, for the second lens position based on the corrupt focus value ($FV_2'$) for the second lens position, the coefficients (a1, a2 and a3) for second frame 42, and a valid focus value ($FV_1$) for the first lens position retrieved from focus value storage device 22. Predictive algorithm unit 36 also predicts a valid focus value, $FV_3$, for the third lens position based on the corrupt focus value ($FV_3'$) for the third lens position, the coefficients (a1, a2 and a3) for third frame 44, and a valid focus value ($FV_2$) for the second lens position retrieved from focus value storage device 22.

For example, predictive algorithm unit 36 may predict the valid focus values for the lens positions illustrated by FIG. 4 based on set of equations (1).

$$FV_0' = FV_0$$

$$FV_1' = a1 \cdot FV_0 + a2 \cdot (FV_0 \rightarrow FV_1) + a3 \cdot FV_1$$

$$FV_2' = a1 \cdot FV_1 + a2 \cdot (FV_1 \rightarrow FV_2) + a3 \cdot FV_2$$

$$FV_3' = a1 \cdot FV_2 + a2 \cdot (FV_2 \rightarrow FV_3) + a3 \cdot FV_3 \quad (1)$$

In this way, predictive algorithm unit 36 may utilize a matrix for the predictive equations $$\begin{bmatrix} FV_0' \\ FV_1' \\ FV_2' \\ \vdots \\ FV_n' \end{bmatrix} = \begin{bmatrix} 1 & 0 & 0 & \cdots & 0 & 0 & 0 & 0 \\ a1 & a2 & a3 & 0 & \cdots & 0 & 0 & 0 \\ 0 & a1 & a2 & a3 & 0 & \cdots & 0 & 0 \\ \vdots & \vdots & \vdots & \vdots & \vdots & \vdots & \vdots & \vdots \\ 0 & 0 & 0 & 0 & \cdots & a1 & a2 & a3 \end{bmatrix} \begin{bmatrix} FV_0 \\ FV_1 \\ FV_2 \\ \vdots \\ FV_n \end{bmatrix}, \quad (2)$$

and solve the matrix equation for the valid focus values.

$$[FV'] = [M] \cdot [FV]$$

$$[FV] = [M]^{-1} \cdot [FV'] \quad (3)$$

In the case where coefficient measurement module 38 sets the first coefficient, a1, equal to one, and sets the second coefficient, a2, and the third coefficient, a3, equal to zero, predictive algorithm unit 36 may predict the valid focus values for the lens positions illustrated by FIG. 4 based on set of equations (4).

$$FV_0'=FV_0$$

$$FV_1'=FV_0$$

$$FV_2'=FV_1$$

$$FV_3'=FV_2 \qquad (4)$$

Upon determining the maximum predicted focus value for the scene, auto-focus controller 34 selects the lens position associated with the maximum focus value for the scene and sends the selected lens position to image capture controller 14. Image capture controller 14 may then set the selected lens position for the scene and sensor array 12 captures an image frame of the scene using the selected lens position.

Figure 5:
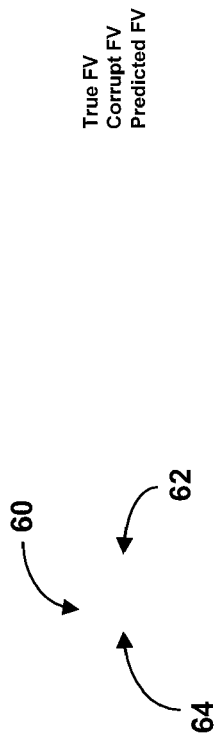
FIG. 5 is a plot illustrating an exemplary comparison of focus values for a scene at a given lens position calculated by different auto-focus processes.

FIG. 5 is a plot illustrating an exemplary comparison of focus values for a scene at a given lens position calculated by different auto-focus processes. As shown in FIG. 5, the plot includes a focus value curve that depends on a blur circle radius of a target within the scene at the given lens position for a true focus value 60, a corrupt focus value 62, and a predicted focus value 64.

True focus value 60 was calculated within a conventional auto-focus process after readout of a valid frame in which integration was initiated after lens settlement at the given lens position. The true focus value 60 has a maximum peak at a blur circle of zero. Corrupt focus value 62 was calculated within either a conventional auto-focus process or a predictive auto-focus process after lens settlement at the given lens position but before the valid frame. The corrupt focus value 62 has a maximum peak at a blur circle of approximately 10 microns. Therefore, corrupt focus value 62 provides an inaccurate focus value for the lens position.

Predicted focus value 64 was calculated within a predictive auto-focus process described herein based on the corrupt focus value 62 calculated after lens settlement at the given lens position but before the valid frame. As shown in FIG. 5, although the predicted focus value 64 is not identical to the true focus value 60, the predicted focus value 64 has a maximum peak at a blur circle of zero. Therefore, the predictive auto-focus process is able to predict an accurate focus value for the scene at the given lens position directly after lens settlement.

Figure 6:
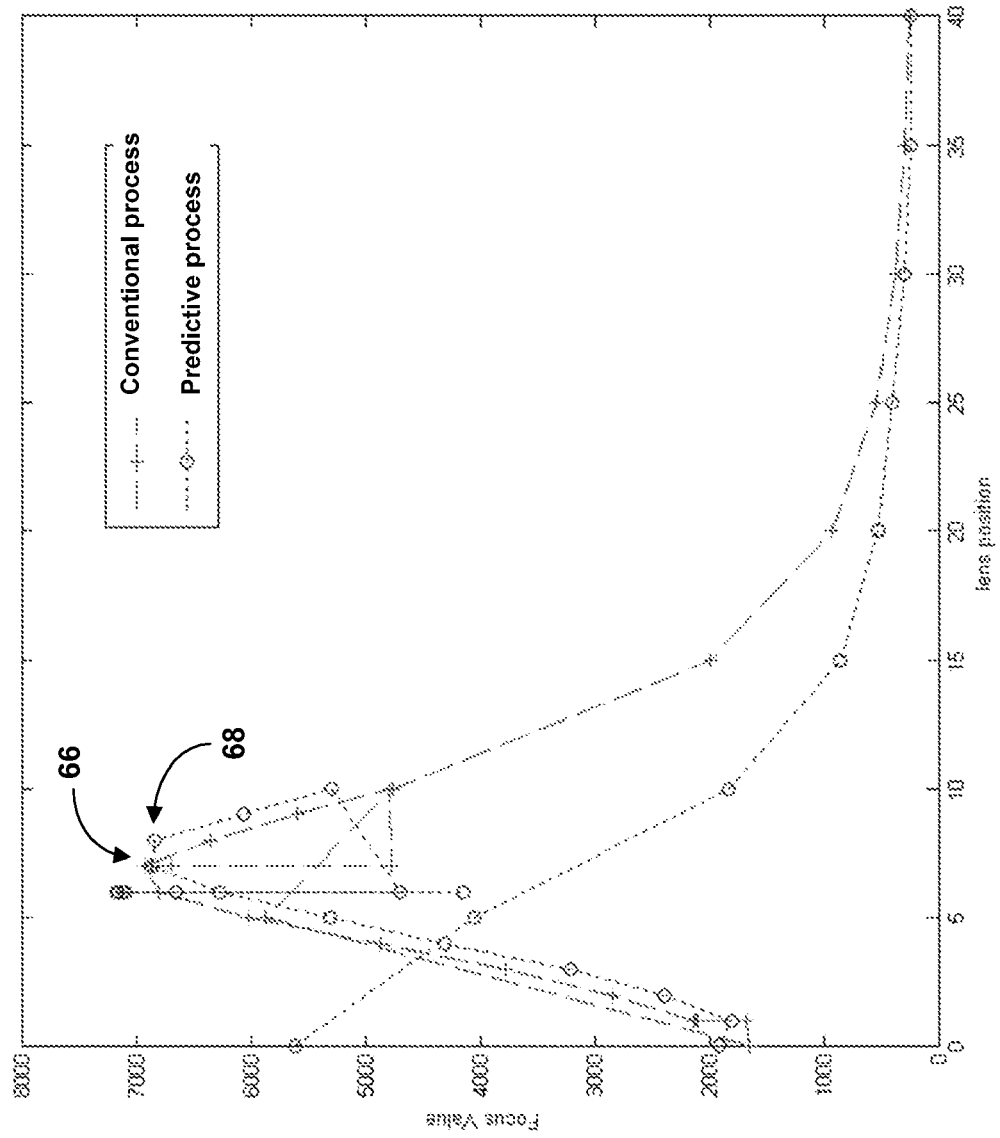
FIG. 6 is a plot illustrating an exemplary comparison of focus values for a scene at a plurality of lens positions calculated by different auto-focus processes.

FIG. 6 is a plot illustrating an exemplary comparison of focus values for a scene at a plurality of lens positions calculated by different auto-focus processes. As shown in FIG. 6, the plot includes a focus value curve for the scene that depends on a lens position for a conventional process 66 and a predictive process 68. Conventional process 66 calculates a true focus value after readout of a valid frame in which integration was initiated after lens settlement at each of the lens positions. Conventional process 66 has a maximum peak at a lens position of approximately 7. Therefore, conventional auto-focus process 66 would select a lens position of 7 to capture an image frame of the scene.

Predictive process 68 calculates a predicted focus value based on a corrupt focus value calculated after lens settlement at each of the lens positions but before the valid frame. As shown in FIG. 6, although predictive process 68 is not identical to the conventional process 66, predictive process 68 also has a maximum peak at a lens position of approximately 7. Therefore, predictive auto-focus process 68 would also select a lens position of approximately 7 to capture an image frame of the scene. Predictive auto-focus process 68 is able to select an accurate lens position for the scene directly after lens settlement based on a predicted focus value.

Figure 7:
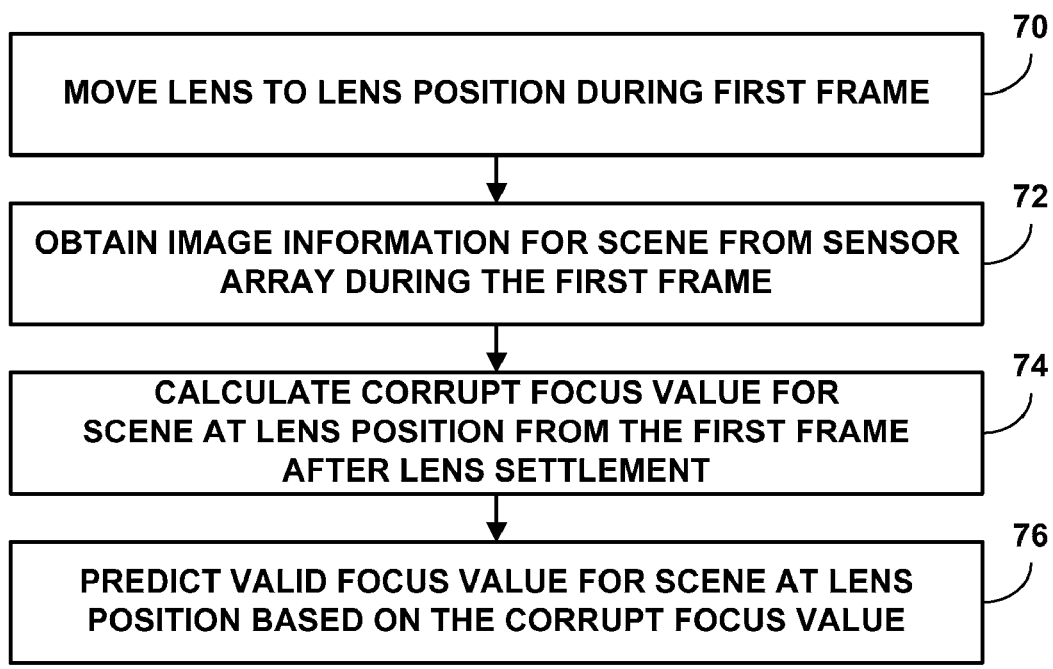
FIG. 7 is a flowchart illustrating exemplary operation of a predictive focus value calculation for a predictive auto-focus process within an image capture device.

FIG. 7 is a flowchart illustrating exemplary operation of a predictive focus value calculation process for a predictive auto-focus process within an image capture device. The operation will be described herein in reference to image capture device 10 from FIG. 1. Image capture controller 14 moves a lens included in image capture device 10 to a lens position during a first frame (70). Sensor array 12 obtains image information for a scene at different movement stages of the lens during the first frame (72).

Image capture controller 14 reads out the image information from sensor array 12 for the first frame and sends the image information to predictive auto-focus module 16. Predictive auto-focus module 18 then calculates a corrupt focus value for the scene at the lens position based on the image information from the first frame directly after lens settlement (74). Predictive auto-focus module 18 predicts a valid focus value for the scene at the lens position based on the corrupt focus value (76).

Predictive auto-focus module 18 may then store the predicted valid focus value for the current lens position in focus value storage device 22 along with valid focus values for previous lens positions. In some cases, predictive auto-focus module 18 determines a next lens position for the lens directly after calculating the corrupt focus value for the current lens position based on the predicted focus value for the current lens position and valid focus values for previous lens positions retrieved from focus value storage device 22. Image capture controller 14 may then move the lens to the next lens position during a second frame. In other cases, predictive auto-focus module 18 selects one of the current lens position or the previous lens positions with the maximum valid focus value for the scene, and sends the selected lens position to image capture controller 14. Image capture controller 14 may then set the selected lens position for the scene and sensor array 12 captures an image frame of the scene using the selected lens position.

Figure 8:
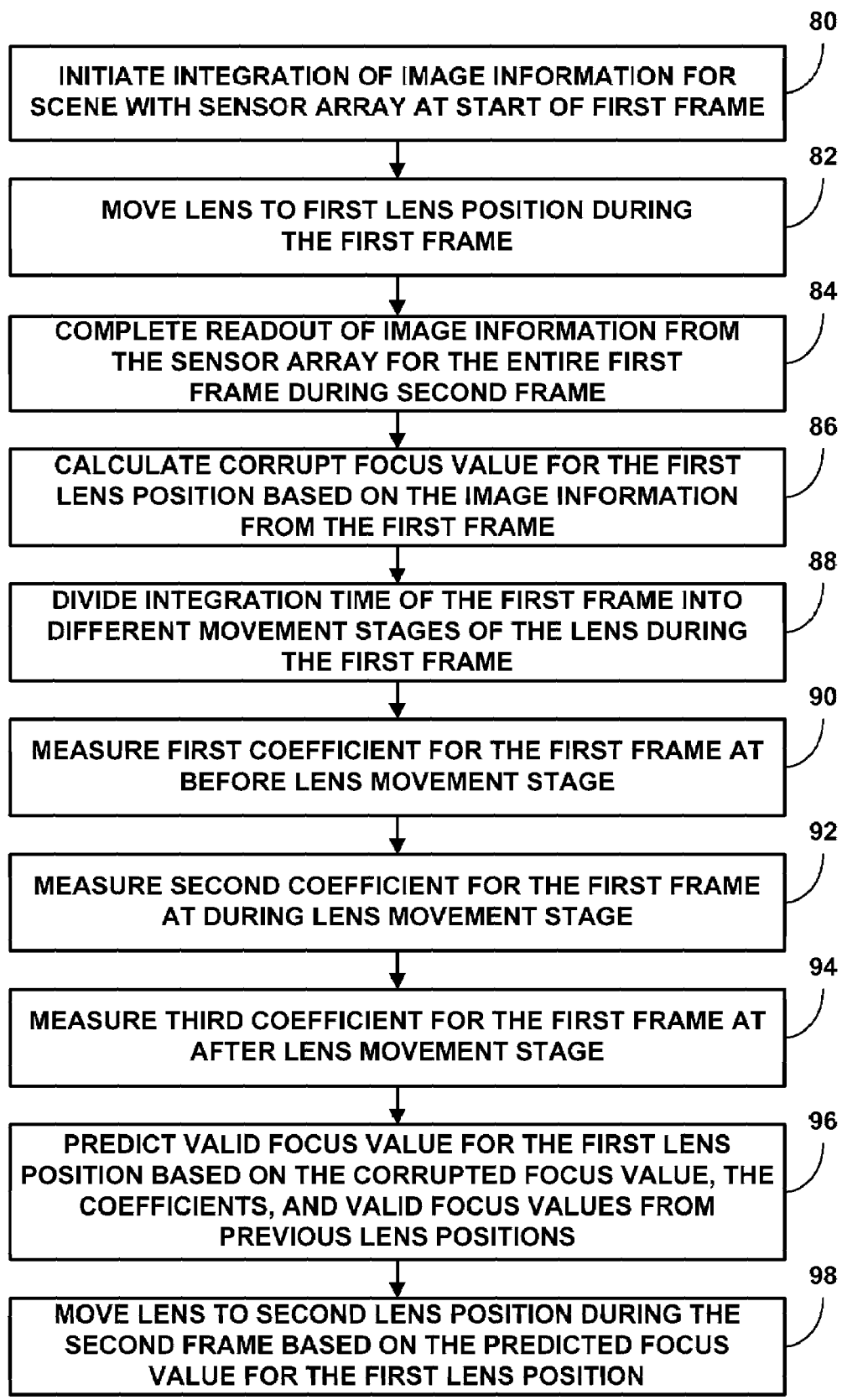
FIG. 8 is a flowchart illustrating exemplary operation of a predictive focus value calculation for a predictive auto-focus process within an image capture device in greater detail.

FIG. 8 is a flowchart illustrating exemplary operation of a predictive focus value calculation process for a predictive auto-focus process within an image capture device in greater detail. The operation will be described herein in reference to predictive auto-focus module 18 from FIG. 3 included in image capture device 10. Sensor array 12 initiates integration of image information for a scene at the start of a first frame (80). In the illustrated embodiment, sensor array 12 may include CMOS sensors that integrate the image information with a rolling shutter in which each line of sensor array 12 begins and ends integration at a different time. Image capture controller 14 reads out the image information from each line of sensor array 12.

Image capture controller 14 moves the lens included in image capture device 10 to a first lens position during the first frame (82). Sensory array 12 continues to integrate image information for the scene at different movement stages of the lens during the first frame. Image capture controller 14 then completes readout of the image information from sensor array 14 for the entire first frame during a second frame (84). Image capture controller 14 sends the image information for the entire first frame to predictive auto-focus module 18.

Predictive auto-focus module 18 includes focus value calculation module 32, auto-focus controller 34, and lens movement module 30. Focus value calculation module 32 calculates a corrupt focus value for the scene at the first lens position based on the image information from the first frame directly after settlement of the lens at the first lens position during a second frame (86). Focus value calculation module 32 sends the corrupt focus value to auto-focus controller 34.

Coefficient measurement module 38 within auto-focus controller 34 divides integration time by sensor array 12 at a reference line of the first frame into the different movement stages of the lens during the first frame (88). For example, the reference line may comprise a center line of sensors within sensor array 12. The integration time may be divided into a before lens movement stage, a during lens movement stage, and an after lens movement stage. Coefficient measurement module 38 then measures a first coefficient for the first frame at the before lens movement stage (90). Coefficient measurement module 38 also measure a second coefficient for the first frame at the during lens movement stage (92). Coefficient measurement module 38 measures a third coefficient for the first frame at the after lens movement stage (94). A sum of the coefficients is equal to one.

Predictive algorithm unit 36 included in auto-focus controller 34 then predicts a valid focus value for the scene at the first lens position based on the corrupt focus value, the coefficients, and valid focus values for previous lens positions retrieved from focus value storage device 22 (96). For example, predictive algorithm unit 36 may predict the valid focus value for the first lens position, $FV_1$, based on the equation:

$$FV_1' = a1 \cdot FV_0 + a2 \cdot (FV_0 \rightarrow FV_1) + a3 \cdot FV_1,$$

wherein $FV_1'$ is the corrupt focus value for the lens position, a1 is the first coefficient, a2 is the second coefficient, a3 is the third coefficient, $FV_0$ is the valid focus value for the previous lens position, and $FV_0 \rightarrow FV_1$ is a transitional focus value during movement from the previous lens position and the first lens position.

However, values of the individual coefficients may be difficult to measure accurately as each of the coefficients is less then one. Therefore, in some cases, coefficient measurement module 38 may estimate the coefficient values. For example, if the reference line is the center line of sensors within sensor array 12, the integration time will be at least half over by the time image capture controller 14 moves the lens to the first lens position during the first frame. Therefore, the first coefficient, a1, will be greater then 0.5, and the second coefficient, a2, and the third coefficient, a3, combined will be less then 0.5. In this case, coefficient measurement module 38 by set the first coefficient, a1, equal to one, and set the second coefficient, a2, and the third coefficient, a3, equal to zero. Predictive algorithm unit 36 may then predict a valid focus value for the first lens position, $FV_1$, based on the equation $FV_2' = FV_1$, wherein $FV_2'$ is the corrupt focus value for a subsequent lens position.

Auto-focus controller 34 sends the predicted focus value to lens movement module 30. Lens movement module 30 determines a second lens position for the lens directly after calculating the corrupt focus value for the first lens position based on the predicted focus value for the first lens position and valid focus values for previous lens positions retrieved from focus value storage device 22. Lens movement module 30 sends movement information to image capture controller 14 that includes movement step size and movement direction information for the lens. Image capture controller 14 then moves the lens from the first lens position to the second lens position during the second frame based on the movement information (98).

Upon determining a maximum predicted focus value for the scene, auto-focus controller 34 selects the lens position associated with the maximum predicted focus value for the scene. Auto-focus controller 34 then sends the selected lens position to image capture controller 14. Image capture controller 14 may set the selected lens position for the scene and sensor array 12 captures an image frame of the scene using the selected lens position.

Figure 9:
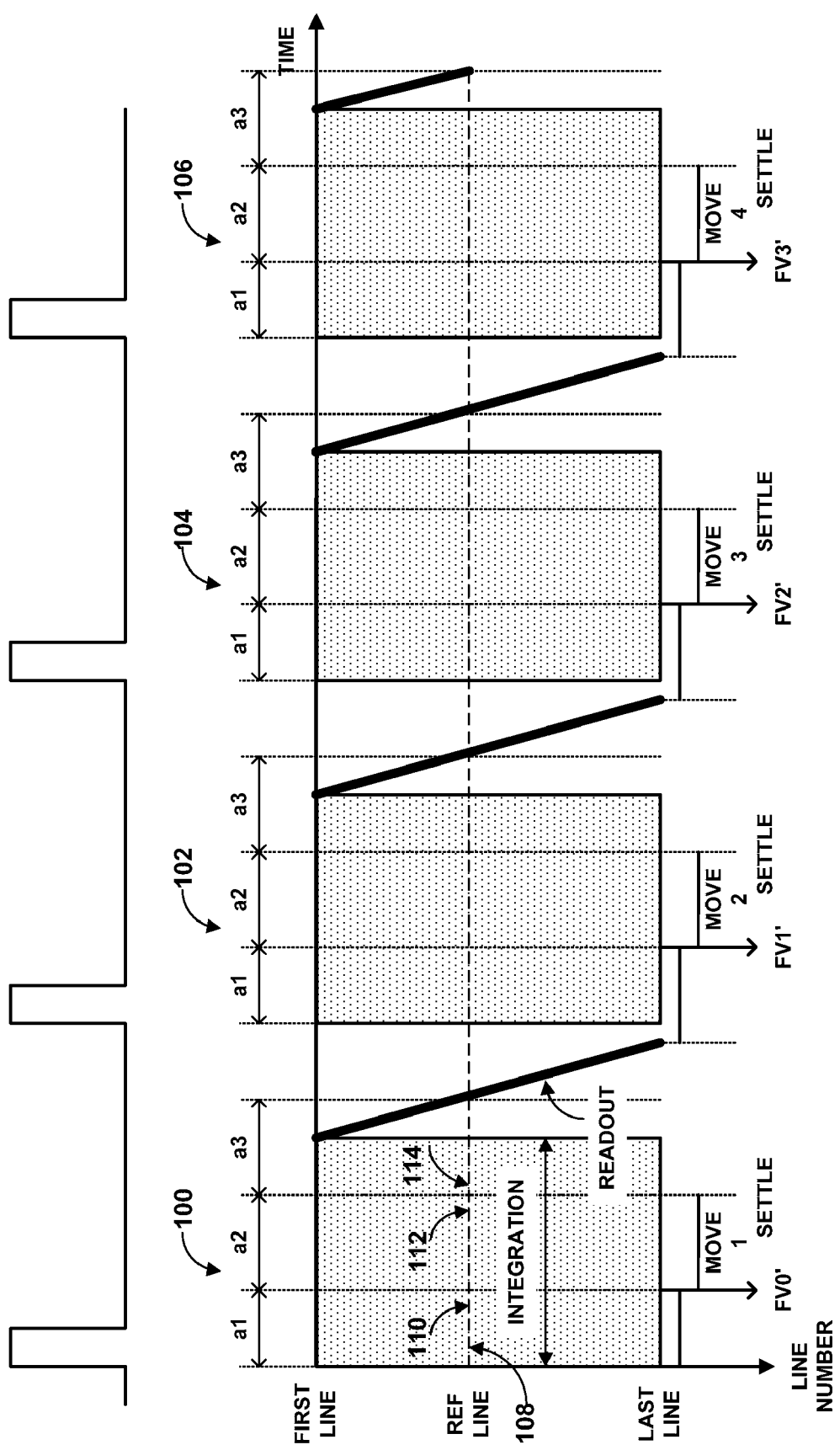
FIG. 9 is a plot illustrating another exemplary integration and readout of image information within a predictive auto-focus process.

FIG. 9 is a plot illustrating another exemplary integration and readout of image information within a predictive auto-focus process. In this embodiment, sensor array 12 within image capture device 10 conforms to an array of CCD sensors with a global shutter. The illustrated plot includes integration and readout time of the image information from each line of sensor array 12 for each frame of the scene. As shown in FIG. 9, at the start of each frame of the scene, sensor array 12 initiates integration of the image information for the scene. The CCD sensors within sensor array 12 are sequentially exposed to the scene by the global shutter to obtain the image information for each frame. The global shutter causes each line of sensor array 12 to begin and end integration at the same time.

The global shutter sensor array embodiment illustrated in FIG. 9 operates substantially similar to the rolling shutter sensor array embodiment illustrated in FIG. 4. Sensor array 12 initiates integration of image information for a scene at the start of a first frame 100. During first frame 100, predictive auto-focus module 18 predicts a valid focus value, $FV_0$, for the scene at an initial lens position based on a corrupt focus value, $FV_0'$, for the initial lens position. Image capture controller 14 then moves the lens from the initial lens position to a first lens position. Lens settlement occurs once the lens reaches the current lens position during first frame 100 and stops moving. Sensor array 12 continues to integrate image information for the scene at different movement stages of the lens during first frame 100. Once integration is complete, image capture controller 14 initiates readout of the image information from each line of sensor array 12 for the entire first frame 100.

Image capture controller 14 sends the image information for the entire first frame 100 to predictive auto-focus module 18. Predictive auto-focus module 18 forwards the image information to focus value calculation module 32. Focus value calculation module 32 calculates a corrupt focus value, $FV_1'$, for the scene at the first lens position based on the image information from first frame 100 after lens settlement at the first lens position during first frame 100.

Focus value calculation module 32 sends the corrupt focus value, $FV_1'$, to auto-focus controller 34. Coefficient measurement module 38 within auto-focus controller 34 divides integration time by sensor array 12 at a reference line 108 of first frame 100 into the different movement stages of the lens during first frame 100. The integration time may be divided into a before lens movement stage 110, a during lens movement stage 112, and an after lens movement stage 114. Coefficient measurement module 38 then measures a first coefficient, a1, for first frame 100 at the before lens movement stage 110, a second coefficient, a2, for first frame 100 at the during lens movement stage 112, and a third coefficient, a3, for first frame 100 at the after lens movement stage 114. In some cases, coefficient measurement module 38 may estimate the coefficient values. For example, coefficient measurement module 38 may set the first coefficient, a1, equal to one, and set the second coefficient, a2, and the third coefficient, a3, equal to zero.

Predictive algorithm unit 36 included in auto-focus controller 34 predicts a valid focus value for the scene at the first lens position, $FV_1$, based on the corrupt focus value ($FV_1'$), the coefficients (a1, a2 and a3) for first frame 100, and a valid focus value ($FV_0$) for the previous lens position retrieved from focus value storage device 22. In the case where coefficient measurement module 38 set the first coefficient, a1, equal to one, and set the second coefficient, a2, and the third coefficient, a3, equal to zero, predictive algorithm unit 36 may predict a valid focus value for the first lens position, $FV_1$, based a corrupt focus value for a subsequent lens position, $FV_2'$.

Predictive auto-focus module 18 continues to predict valid focus values at each of a plurality of lens positions based on corrupt focus values for corresponding lens positions, coefficients of corresponding frames, and previous valid focus values until the maximum focus value for the scene is predicted at one of the lens positions. For example, predictive algorithm unit 36 may predict the valid focus values for the lens positions illustrated by FIG. 9 based on set of equations (1) given above. Upon determining the maximum predicted focus value for the scene, auto-focus controller 34 selects the lens position associated with the maximum focus value for the scene and sends the selected lens position to image capture controller 14. Image capture controller 14 may then set the selected lens position for the scene and sensor array 12 captures an image frame of the scene using the selected lens position.

A number of embodiments have been described. However, various modifications to these embodiments are possible, and the principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modem chip or chipset that is configured to control operations of various devices of a personal communications device such as a cellular telephone.

The techniques described in this disclosure may be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

As further examples, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

In this disclosure, techniques have been described for predictive focus value calculation within image capture devices. The techniques include performing an auto-focus process within an image capture device by predicting a focus value for a scene at a lens position of a lens included in the image capture device based on a corrupt focus value for the lens position calculated from a first frame directly after lens settlement during a second frame. Therefore, the auto-focus process may determine size and direction of movement for the lens to a next lens position based on the predicted valid focus value, and move the lens to the next lens position during the second frame. In this way, the techniques may move the lens to another lens position during each frame, greatly reducing auto-focus latency by doubling or tripling the speed of the auto-focus process.

According to the techniques described herein, an image capture device includes an image capture controller that moves a lens to a plurality of lens positions during each frame and a sensor array that obtains image information for a scene at different movement stages of the lens during each frame. After readout of the image information from an entire first frame, a predictive auto-focus module included in the image capture device calculates a corrupt focus value for the scene at a first lens position from the first frame directly after lens settlement at the first lens position during a second frame. The predictive auto-focus module predicts a valid focus value for the scene at the first lens position based on the corrupt focus value for the first lens position. The predictive auto-focus module may then determine a second lens position based on the predicted lens position, and direct the image capture controller to move the lens to the determined second lens position during the second frame. These and other embodiments are within the scope of the following claims.

The invention claimed is:

1. A method comprising:
    moving a lens included in an image capture device to a lens position during a first frame;
    calculating a corrupt focus value for a scene at the lens position from the first frame after lens settlement; and
    predicting a valid focus value for the scene at the lens position based on the corrupt focus value.

2. The method of claim 1, further comprising obtaining image information for the scene from a sensor array included in the image capture device at different movement stages of the lens during the first frame, wherein calculating a corrupt focus value comprises calculating the corrupt focus value for the scene at the lens position based on the image information from the first frame.

3. The method of claim 2, further comprising measuring coefficients for the first frame based on the different movement stages of the lens during the first frame, wherein predicting a valid focus value comprises predicting a valid focus value for the scene at the lens position based on the corrupt focus value for the lens position, the coefficients for the first frame, and a valid focus value for a previous lens position.

4. The method of claim 1, wherein the lens position comprises a first lens position, further comprising moving the lens to a second lens position during a second frame after calculating the corrupt focus value for the first lens position.

5. The method of claim 1, further comprising:
    moving the lens to a different lens position during each of a plurality of frames of the scene;
    calculating corrupt focus values for the scene at different lens positions from corresponding frames after lens settlement during subsequent frames; and
    predicting valid focus values for the scene at each of the different lens positions based on the corrupt focus values for corresponding lens positions.

6. The method of claim 5; further comprising:
    selecting one of the lens positions for the scene based on the predicted focus values;

communicating the selected one of the lens positions to an image capture controller included in the image capture device; and capturing an image frame of the scene with a sensor, array included in the image capture device using the selected one of the lens positions.

7. The method of claim 5, further comprising:

determining a next lens position of the lens based on the corrupt focus values;

sending movement information that includes a movement step size and a movement direction for the lens to an image capture controller included in the image capture device; and moving the lens to the determined next lens position based on the movement information.

8. The method of claim 1, further comprising:

initiating integration of image information for the scene with each line of a sensor array included in the image capture device at the start of the first frame;

completing readout of the image information for the scene from each line of the sensor array for the entire first frame; and measuring coefficients of integration time at a reference line of the first frame based on different movement stages of the lens during the first frame, wherein predicting a valid focus value for the lens position comprises predicting a valid focus value based on the corrupt focus value for the lens position, the coefficients for the first frame, and a valid focus value for a previous lens position.

9. The method of claim 8, wherein calculating a corrupt focus value comprises calculating the corrupt focus value for the scene at the lens position after receiving the image information readout from the entire first frame.

10. The method of claim. 8, wherein measuring coefficients for the first frame comprises:

dividing integration time at the reference line of the first frame into a before lens movement stage, a during lens movement stage, and an after lens movement stage;

measuring a first one of the coefficients for the first frame at the before lens movement stage;

measuring a second one of the coefficients for the first frame at the during lens movement stage; and measuring a third one of the coefficients for the first frame at the after lens movement stage, wherein a sum of the coefficients is equal to one.

11. The method of claim 10, wherein predicting a valid focus value for the lens position comprises predicting the valid focus value for the lens position, $FV_1$ based on the equation $FV_1'=a1 \cdot FV_0 + a2 \cdot (FV_0 \rightarrow FV_1) + a3 \cdot FV_1$, wherein $FV_1'$ is the corrupt focus value for the lens position, a1 is the first one of the coefficients, a2 is the second one of the coefficients, a3 is the third one of the coefficients, $FV_0$ is the valid focus value for the previous lens position, and $FV_0 \rightarrow FV_1$ is a transitional focus value during movement from the previous lens position and the lens position.

12. The method of claim. 8, wherein measuring coefficients for the first frame comprises:

dividing integration time at the reference line of the first frame into a before lens movement stage, a during lens movement stage, and an after lens movement stage;

setting a first one of the coefficients for the first frame at the before lens movement stage equal to one;

setting a second one of the coefficients for the first frame at the during lens movement stage equal to zero; and setting a third one of the coefficients for the first frame at the after lens movement stage equal to zero.

13. The method of claim 12, wherein predicting a valid focus value for the lens position comprises predicting the valid focus value for the lens position, $FV_1$, based on the equation $FV_2'=FV_1$, wherein $FV_2'$ is a corrupt focus value for a subsequent lens position.

14. A method comprising:

calculating a corrupt focus value for a scene at a first lens position of a lens included in an image capture device from a first frame after lens settlement at the first lens position, wherein the first frame begins before lens settlement at the first lens position;

predicting a valid focus value for the scene at the first lens position based on the corrupt focus value for the first lens position; and moving the lens to a second lens position during a second frame after calculating the corrupt focus value for the first lens position.

15. The method of claim 14, further comprising:

calculating a corrupt focus value for the scene at the second lens position from the second frame after lens settlement at the second lens position during a third frame; and predicting a valid focus value for the scene at the second lens position based on the corrupt focus value for the second lens position.

16. The method of claim 14, further comprising:

obtaining image information for the scene from a sensor array included in the image capture device at different movement stages of the lens during the second frame;

calculating a corrupt focus value for the scene at the second lens position based on the image information from the second frame;

measuring coefficients for the second frame based on different movement stages of the lens during the second frame; and predicting a valid focus value for the second lens position based on the corrupt focus value for the second lens position, the coefficients for the second frame, and the predicted focus value for the first lens position.

17. A computer-readable medium comprising instructions that cause a programmable processor to:

move a lens included in an image capture device to a lens position during a first frame;

calculate a corrupt focus value for a scene at the lens position from the first frame after lens settlement; and predict a valid focus value for the scene at the lens position based on the corrupt focus value.

18. The computer-readable medium of claim 17, further comprising instructions that cause the programmable processor to:

initiate integration of image information for the scene with each line of a sensor array included in the image capture device at the start of the first frame;

complete readout of the image information for the scene from each line of the sensor array for the entire first frame; and measure coefficients of integration time at a reference line of the first frame based on different movement stages of the lens during the first frame; and predict a valid focus value for the lens position based on the corrupt focus value for the lens position, the coefficients for the first frame, and a valid focus value for a previous lens position.

19. The computer-readable medium of claim 18, wherein the instructions cause the programmable processor to calculate the corrupt focus value for the scene at the lens position after receiving the image information readout from the entire first frame.

20. The computer-readable medium of claim 18, wherein the instructions cause the programmable processor to:
- divide integration time at the reference line of the first frame into a before lens movement stage, a during lens movement stage, and an after lens movement stage;
- measure a first one of the coefficients for the first frame at the before lens movement stage;
- measure a second one of the coefficients for the, first frame at the during lens movement stage; and
- measure a third one of the coefficients for the first frame at the after lens movement stage, wherein a sum of the coefficients is equal to one.

21. The computer readable medium of claim 20, wherein the instructions cause the programmable processor, to predict the valid focus value for the lens position, $FV_1$, based on the equation $FV_1' = a1 \cdot FV_0 + a2 \cdot (FV_0 \rightarrow FV_1) + a3 \cdot FV_1$, wherein $FV_1'$ is the corrupt focus value for the lens position, a1 is the first one of the coefficients, a2 is the second one of the coefficients, a3 is the third one of the coefficients, $FV_0$ is the valid focus value for the previous lens position, and $FV_0 \rightarrow FV_1$ is a transitional focus value during movement from the previous lens position and the lens position.

22. The computer readable medium of claim 20, wherein the instructions cause the programmable processor to:
- divide integration time at the reference line of the first frame into a before lens movement stage, a during lens movement stage, and an after lens movement stage;
- set a first one of the coefficients for the first frame at the before lens movement stage equal to one;
- set a second one of the coefficients for the first frame at the during lens movement stage equal to zero; and
- set a third one of the coefficients for the first frame at the after lens movement stage equal to zero.

23. The computer-readable medium of claim 22, wherein the instructions cause the programmable processor to predict the valid focus value for the lens position, $FV_1$, based on the equation $FV_2' = FV_1$, wherein $FV_2'$ is a corrupt focus value for a subsequent lens position.

24. The computer-readable medium of claim 17, wherein the lens position comprises a first lens position, further comprising instructions that cause a programmable processor to move the lens to a second lens position during a second frame after calculating the corrupt focus value for the first lens position.

25. The computer-readable medium of claim 24, further comprising instructions that cause the programmable processor to:
- receive image information for the scene from a sensor array included in the image capture device at different movement stages of the lens during the second frame;
- calculate a corrupt focus value for the scene at the second lens position based on the image information from the second frame;
- measure coefficients for the second frame based on different movement stages of the lens during the second frame; and
- predict a valid focus value for the second lens position based on the corrupt focus value for the second lens position, the coefficients for the second frame, and the predicted focus value for the first lens position.

* * * * *